US012764045B2

(12) United States Patent
Paluru et al.

(10) Patent No.: US 12,764,045 B2
(45) Date of Patent: Oct. 13, 2026

(54) SYSTEM AND METHOD FOR ACCURATE MEASUREMENT OF NETWORK FABRIC HEALTH IN A DATA CENTERS

(71) Applicant: Aviz Networks, Inc., San Jose, CA (US)

(72) Inventors: Madhu Paluru, Fremont, CA (US); Chidambaram Bhagavathiperumal, Livermore, CA (US)

(73) Assignee: Aviz Networks, Inc., San Jose, CA (US)

( * ) Notice: Subject to any disclaimer, the term of this patent is extended or adjusted under 35 U.S.C. 154(b) by 129 days.

(21) Appl. No.: 18/827,734

(22) Filed: Sep. 7, 2024

(65) Prior Publication Data

US 2026/0074973 A1 Mar. 12, 2026

(51) Int. Cl.
*H04L 43/08* (2022.01)
*H04L 45/02* (2022.01)

(52) U.S. Cl.
CPC .............. *H04L 43/08* (2013.01); *H04L 45/02* (2013.01)

(58) Field of Classification Search
CPC ................................ H04L 43/08; H04L 45/02
See application file for complete search history.

(56) References Cited

U.S. PATENT DOCUMENTS 8,291,069 B1 * 10/2012 Phillips ................... G06F 17/18 709/224
11,474,077 B2 * 10/2022 Lal ......................... G01N 29/07
2011/0116366 A1 * 5/2011 Smith ..................... H04L 45/02 370/256
2015/0195185 A1 * 7/2015 Dasgupta ................ H04L 45/02 370/252
2021/0058299 A1 * 2/2021 Ganguli ................ H04L 12/465
2022/0272022 A1 * 8/2022 Akhavain Mohammadi ............... H04L 45/02
2024/0235984 A1 * 7/2024 Chunduri ................ H04L 45/02
2025/0106768 A1 * 3/2025 Barth ...................... H04L 45/02
2025/0363007 A1 * 11/2025 Karne ................. G06F 11/1423
2026/0032858 A1 * 1/2026 Dicristoforo ...... H05K 7/20272

FOREIGN PATENT DOCUMENTS

CN 101296041 B * 5/2012
CN 205246062 U * 5/2016
CN 212844048 U * 3/2021

* cited by examiner

*Primary Examiner* — Richard G Keehn
(74) *Attorney, Agent, or Firm* — Select IP Law Corporation; Ashkon Cyrus

(57) ABSTRACT

In some aspects, the method may include collecting system and transceiver information via sensors and transceivers to create collected system and transceiver information. Also, the method may include starting a timer by a timing module. Furthermore, the method may include collecting drop counters to form counters TLV. In addition, the method may include collecting optics information periodically including optics temperature, voltage, and power. Moreover, the method may include forming a sysinfo TLV using a network processor based on the collected system and transceiver information. Also, the method may include generating an event in an event handler. Furthermore, the method may include transmitting a packet to be received by a receive link-service and parsed by a network communication interface, where the counters TLV are correlated with local counters on the receive link-service.

18 Claims, 5 Drawing Sheets

SYSTEM AND METHOD FOR ACCURATE MEASUREMENT OF NETWORK FABRIC HEALTH IN A DATA CENTERS

BACKGROUND

In modern data centers it is important to keep network devices healthy to ensure that data moves smoothly from one point to another. However, this can be a challenging task with the tools currently available. Standard protocols like Bi-directional Forwarding Detection (BFD) can be used to monitor link health and communicate failures to routing protocols. Despite their utility, BFD and similar protocols come with notable issues that make them unreliable in maintaining network stability.

One major limitation of BFD-like protocols is their reactive nature; they only trigger alerts and responses after an issue has already occurred. This delayed response can lead to significant disruptions in network traffic, particularly in high-demand environments. Moreover, BFD is not designed to measure packet loss between nodes, which is a crucial metric for assessing ongoing network performance and detecting potential issues early. Additionally, BFD-like protocols are resource-intensive, consuming significant CPU power and potentially degrading the performance of other host services.

What is needed is a more efficient system for accurate measurement of network fabric health.

SUMMARY

The present disclosure provides systems and methods to create an application that measures network fabric on one or more switches running an open network operating system (for example SONiC). According to an embodiment of the present disclosure, the application is configured to run as a standalone service.

Some implementations herein further relate to systems and methods for accurate monitoring and reporting of flows of organizational networks impacted due to link failures in data centers. Embodiments of the present disclosure further disclose methods of identification of customer traffic and flow impacted by such link failures.

According to an embodiment of the present disclosure, a new service is initiated to determine the health between any two nodes over a particular link in a network. This new service may aggregate network health metrics between nodes and across nodes within the fabric network. It can be appreciated that such an approach provides comprehensive analytics on the overall status and potential health of the data center fabric.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include collecting system and transceiver information via sensors and transceivers to create collected system and transceiver information. The method may also include starting a timer by a timing module. The method may furthermore include collecting drop counters to form a Type-Length-Value (TLV) structure for the counters. The method may in addition include collecting optics information periodically including optics temperature, voltage, and power. The method may moreover include forming a sysinfo TLV structure using a network processor based on the collected system and transceiver information. The method may also include generating an event in an event handler. The method may furthermore include transmitting a packet to be received by a receive link-service and parsed by a network communication interface, where the counters TLV structure is correlated with local counters on the receive link-service. Other embodiments of this aspect include corresponding computer systems, apparatus, and computer programs recorded on one or more computer storage devices, each configured to perform the actions of the methods.

Implementations may include one or more of the following features. A method where starting the link-service includes initializing communication protocols required for link establishment. A method where collecting system and transceiver information includes retrieving data from network devices and sensors. A method where starting a timer includes setting a predefined interval for periodic monitoring and data collection. A method where forming the sysinfo TLV structure includes encapsulating the collected system and transceiver information into a Type-Length-Value structure. A method where transmitting a packet to be received and parsed includes using secure transmission protocols to ensure data integrity and confidentiality.

After identification, targeted identified data may be exported or reported as an alert to a network administrator with accurate information on the flows.

DETAILED DESCRIPTION

The present disclosure provides a system and method to proactively detect link failures and notify local control-plane or external controllers to mitigate the failures before customer impact.

According to an embodiment of the present disclosure, said method measures packet loss between the nodes using counters. It can be appreciated that the efficient natures of the methods described are able to consume minimal system resources including CPU and memory. The techniques outlined herein can be applied to both layer two and layer three designs and are independent of data center architecture.

Figure 1:
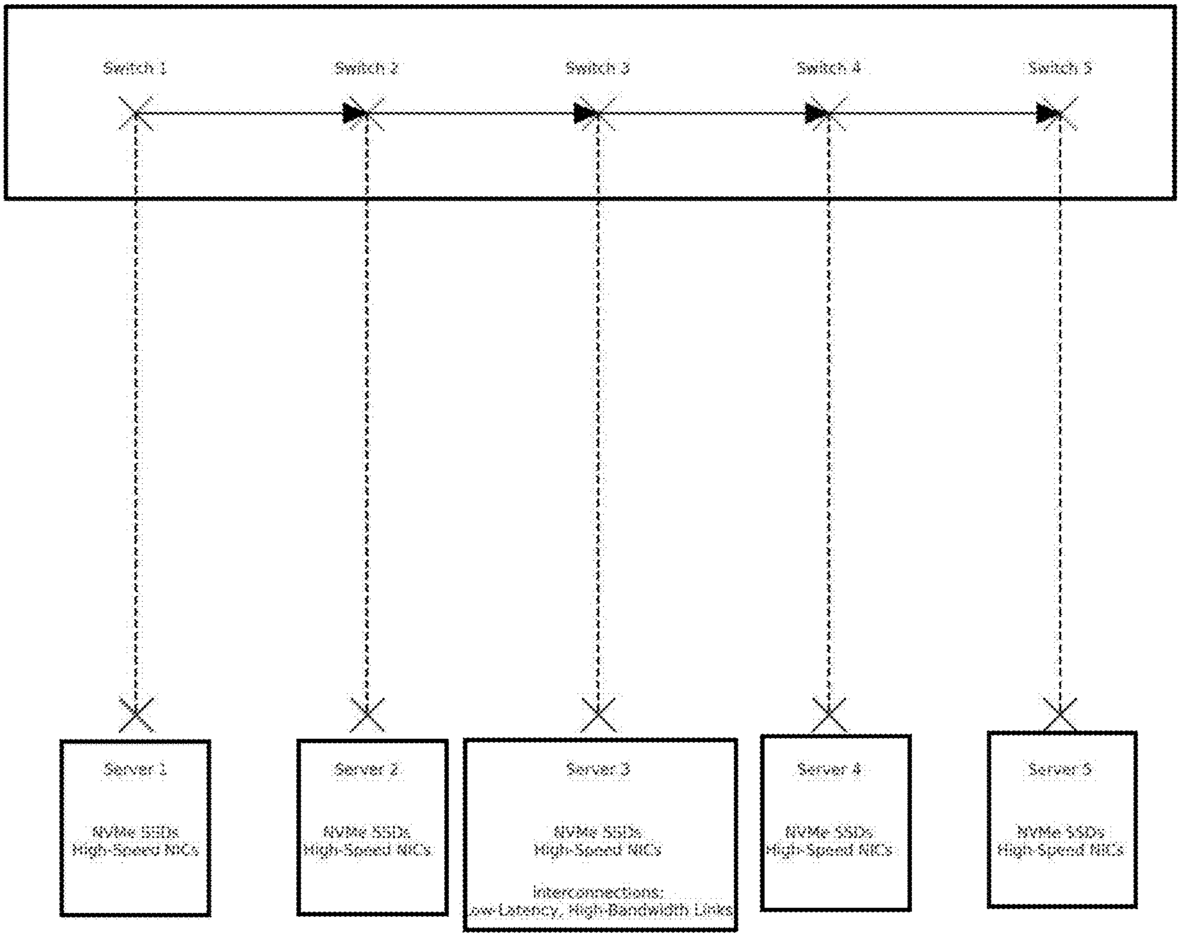
FIG. 1 discloses a system architecture according to an embodiment of the present disclosure.

FIG. 1 discloses a system architecture according to an embodiment of the present disclosure. According to an embodiment of the present disclosure, high-capacity programmable network switches form the backbone of an open networking operating system architecture. These switches are configured to run the standalone link-service application.

High-performance servers serve as compute and storage nodes to manage network operations, data processing, and AI workloads. These servers may include high-capacity NVMe SSDs for rapid data storage and retrieval. Additionally, high-speed NICs may be implemented for ensuring low-latency, high-bandwidth connectivity between network components.

According to an embodiment of the present disclosure, a link service is deployed on an as-needed basis depending on the use case. The link service can be a low memory, highly efficient application running on switches supporting Open Networking Operating Systems.

Figure 2:
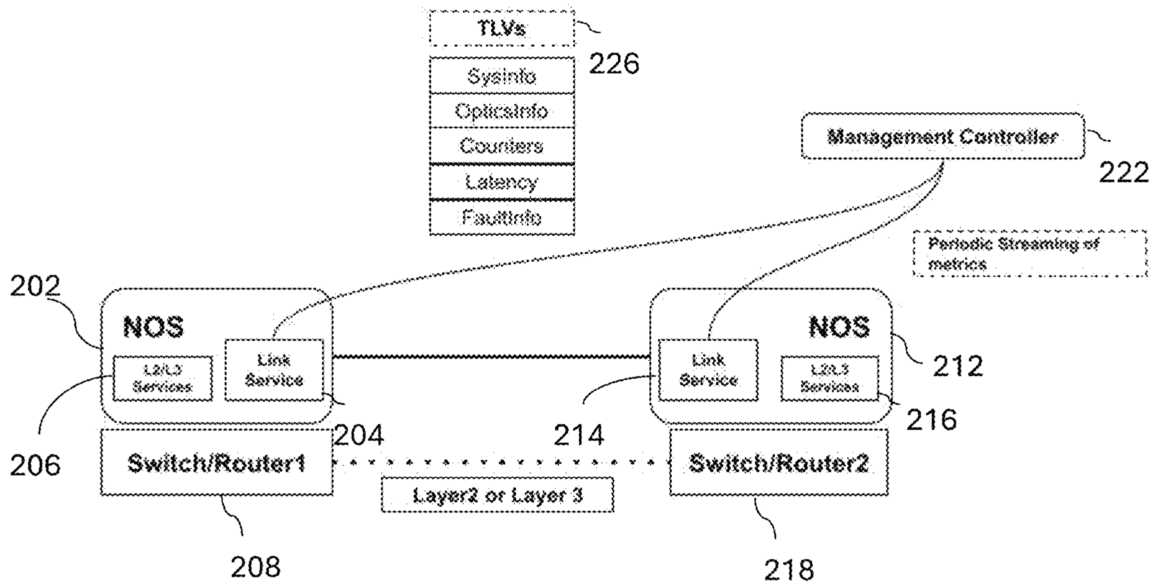
FIG. 2 discloses a system architecture according to an embodiment of the present disclosure.

FIG. 2 discloses a system architecture according to an embodiment of the present disclosure. Link service 204 and L2/L3 services 206 run inside Network Operating System (NOS) 202. The NOS can be a specialized software platform configured to manage and control network hardware. This allows for the operation of network devices such as switches and routers. By taking control of networking functions, the NOS provides an efficient way of network management, enhances security, and improves performance.

Within NOS 202, the link service 204 is responsible for establishing and maintaining network connections, ensuring that data can flow smoothly between different parts of the network. The L2 (Layer 2) services 206 handle tasks related to the data link layer of the OSI model, such as node-to-node data transfer, error detection, and handling MAC addresses.

Meanwhile, the L3 (Layer 3) services 206 manage the network layer tasks, including data routing, packet forwarding, and handling IP addresses.

NOS 202 is connected to switch/router 208, which directs data traffic between various network segments, ensuring efficient data flow and communication.

Similarly, link service 214 and L2/L3 services 216 operate within NOS 212. Like NOS 202, NOS 212 is responsible for managing and controlling the network's hardware and software components. It provides a comprehensive platform for network management, enhancing the network's efficiency and reliability.

Link service 214 within NOS 212 focuses on maintaining robust and stable network connections, while the L2/L3 services 216 ensure the proper functioning of data link and network layer activities. NOS 212 is connected to switch/router 218, which performs critical functions of managing and directing data traffic within the network, similar to switch/router 208. The switches/routers serve as essential devices that facilitate communication between different network segments, optimizing data transfer and ensuring network stability.

The Type-Length-Value (TLV) structures, referred to as TLVs 226, include critical information for network management and monitoring. These TLVs encapsulate various data types, including SysInfo, OpticsInfo, Counters, Latency, and FaultInfo. The SysInfo TLV provides details about the system's operating environment, such as the OS and model, along with optical transceiver information. The OpticsInfo TLV contains vital data on the optics, such as temperature, voltage, and power levels. The Counters TLV provides important metrics on transmit/receive drops, including errors and discards. Latency measurements are crucial for assessing network performance, and FaultInfo captures data on any local or remote issues, such as signal detection problems or laser faults. Together, these TLVs play a crucial role in maintaining network reliability and efficiency by offering comprehensive insights into various aspects of network operations.

Management controller 222 is connected to both link service 204 and link service 214, providing a centralized control mechanism for the network. The management controller plays a vital role in overseeing the operations of the link services. Management controller 222 acts as a command center, monitoring network performance, troubleshooting issues, and optimizing the overall network operations. By connecting to both link services, the management controller 222 ensures coordinated and synchronized network management, which is crucial for maintaining high network performance and reliability. This centralized approach allows for streamlined network management, reducing complexity, and enhancing the ability to quickly respond to network issues or changes.

According to an embodiment of the present disclosure, orchestration, and management tools (like Kubernetes) are implemented for container orchestration. Tools like Prometheus and Grafana may be implemented for real-time monitoring and visualization. Together, these components form a scalable, flexible, and efficient network infrastructure.

According to an embodiment of the present disclosure the link-service agent will have two sub-modules. The first sub module is responsible for generating the metrics and the second sub module is responsible for correlation and export. This dual approach provides an organized process to monitor and analyze the network fabric health.

According to an embodiment of the present disclosure the metric generation submodule is responsible for generating detailed metrics on performance statistics of the network links. According to an embodiment of the present disclosure it continuously collects data on parameters such as latency, packet loss, bandwidth utilization, jitter, and error rates.

As an example, there could be a data center network where this metric generation submodule monitors the latency and packet loss between two core switches and if the latency exceeds the predefined threshold or packet loss and increases then it immediately flags those anomalies to be sent for further analysis.

The metric generation submodule may be implemented as a lightweight application running on the network switches. It can be appreciated that this approach utilizes minimal memory and processing power. According to an embodiment of the present disclosure open networking operating system capabilities are utilized to execute real time data collection. It can be appreciated that such compartmentalization allows the system to perform this real time data collection without affecting switch performance.

The correlation and export submodule is configured to take the raw metrics generated by the metric generation submodule and correlate them to provide meaningful insights. The correlation and export submodule aggregates data from the multiple links and nodes to identify packets issues, patterns, trends, and any other potential issues in the network fabric. This processed data is then exported to the centralized management system or other dashboards for further analysis and action. As an example, the correlation and export sub module can correlate metrics such as latency and packet loss for multiple switches to determine if the problem is localized to specific devices or widespread across the network.

The correlation and export submodule can be implemented by specialized software to analyze and identify the data, correlate the data, and generate reports. The export function may be provided which can ensure that the insights are available to network administrators. These insights can be made available through API's, dashboards, or network management tools.

Metrics are collected between any two nodes using a lightweight packet transport. The packet will be transmitted and received by the link-service daemons. The packets will determine the health of the link between the nodes using a plurality of parameters.

Such parameters may include successful transmission and reception of these packets. Such parameters may further include collecting and reporting accurate fault types (local or remote) due to laser issues, performance of optics using standard methodologies like FEC (forward-error-correction), and optics metrics including temperature, voltage, and power. Such parameters may further include measurement of packet loss over the link using the CRC errors or discards. The parameters are collected using three packet formats. The agent supports three packet types: Data packets, Event Notification packets, and TLV packets. Data packets collect and report metrics related to the link from the ASIC and Optics. Event Notification packets are triggered by link-down events and when optics are plugged in or removed from the interface, collecting extended metrics from the ASIC and optics during these events.

SysInfo packets (0×1) provide system information such as OS, model, and Optical Transceiver details, including vendor, serial, and manufacturer information. These packets are categorized as Event Packets and are sent on service start and insertion of approved optical transceivers. Drop Counters packets (0×2) report transmit and receive drops, including CRC errors and discards.

These are Data Packets and can be sent every five seconds. Optics Information packets (0×3) contain data on optics temperature, voltage, and power. These are also Data Packets and are sent every five seconds. FEC and BER packets (0×4) report uncorrected FEC errors for the enabled interface and bit error rate, categorized as Data Packets sent on request. Fault Reporting packets (0×5) provide information on local/remote faults, laser status, and signal detection. These are Event Packets sent during link-down events.

The implementation of these packet formats and types ensures a comprehensive approach to network monitoring and management. By utilizing Data packets to collect regular metrics and Event Notification packets for significant events, the system maintains a balanced load on the network while ensuring critical data is captured and reported in real time. This dual approach enhances the reliability and responsiveness of network operations, allowing for quick identification and resolution of issues.

Incorporating SysInfo, Drop Counters, Optics Information, FEC and BER, and Fault Reporting into the TLV formats provides a detailed view of the network's health and performance. The system information and optical transceiver details help in maintaining an accurate inventory and configuration management.

Regular updates on drop counters and optics information allow for proactive maintenance and early detection of potential problems. The ability to request specific data on FEC errors and bit error rate as needed ensures that detailed diagnostics are available for troubleshooting.

This structured approach to collecting and reporting network metrics through various TLV formats and packet types is crucial for effective Link-Service Metrics Correlation and Export. It enables network administrators to maintain a high level of visibility into the network's operational state, ensuring that any issues are promptly addressed, and overall network performance is optimized.

Figure 3:
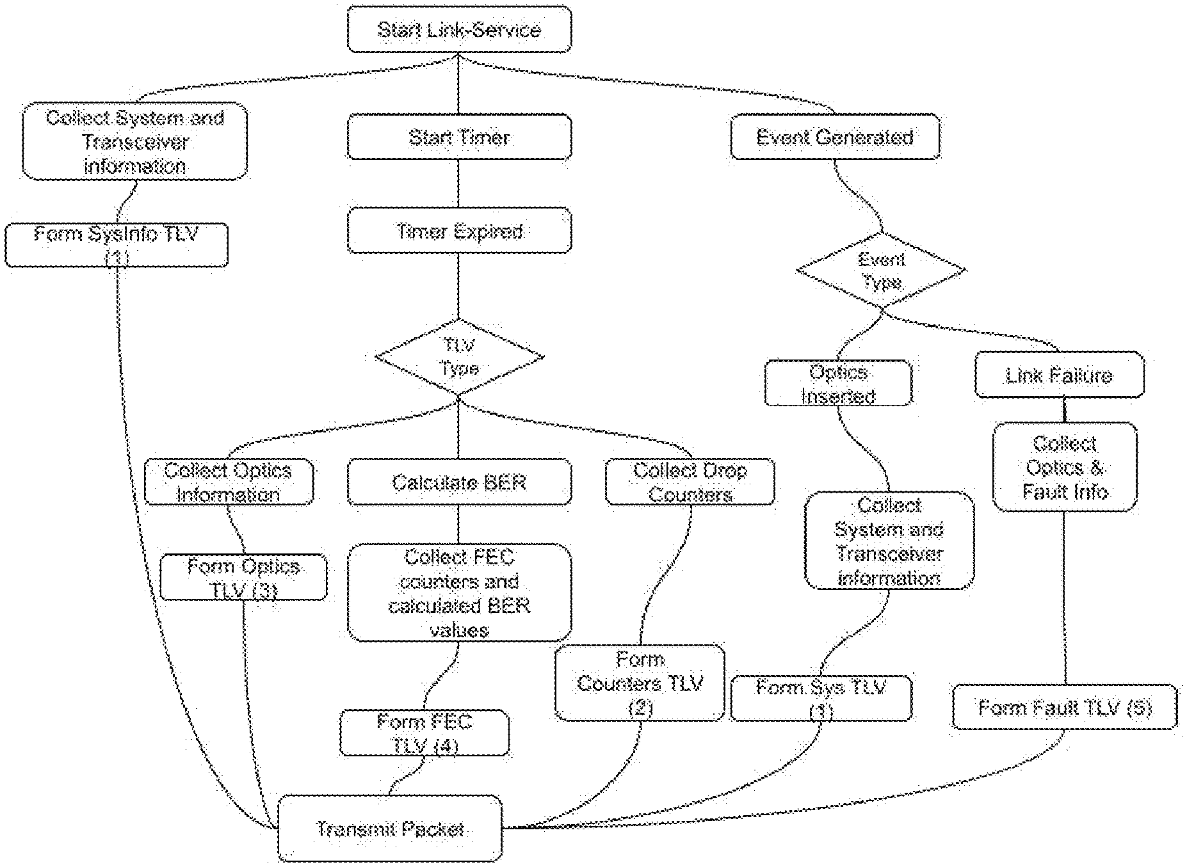
FIG. 3 discloses a link-service transit flow diagram according to an embodiment of the present disclosure.

FIG. 3 discloses a link-service transit flow diagram according to an embodiment of the present disclosure. The link-service initiation begins with the collection of system and transceiver information, which are essential for monitoring and managing the network's health and performance. Once this information is gathered, a timer is started to regulate the periodic checks and events within the network. When an event is generated, such as a link failure or the insertion of new optics, the system collects additional relevant data, including optics and fault information. Upon the expiration of the timer, the collected system and transceiver data is used to form a System Information Type-Length-Value (SysInfo TLV), a structured format for encapsulating this data.

The type of event that was generated determines the specific TLV type that will be formed. For example, if the event type is a link failure or optics insertion, the link-service will collect detailed optics information and fault data. It will calculate the Bit Error Rate (BER) and gather drop counters, which provide insights into data loss and error rates. The system also collects Forward Error Correction (FEC) counters and recalculates BER values to ensure accurate error monitoring.

Once all the necessary data is collected, the system forms various TLVs to encapsulate the information. These include the Optics TLV (Type 3) for optics data, Counters TLV (Type 2) for drop counters, Sys TLV (Type 1) for system information, Fault TLV (Type 5) for fault data, and FEC TLV (Type 4) for FEC counters and BER values. Finally, the link-service transmits a packet containing these TLVs, ensuring that all critical information is communicated across the network for further processing and action. This systematic approach enables efficient network management and quick response to potential issues, maintaining the network's reliability and performance.

The robust monitoring framework not only supports current network requirements but also provides a scalable foundation for future network expansions and technological advancements.

This component will collect the metrics from the neighbor using the TLVs, it does correlation by comparing against the recommended values and exports the enhanced metrics to the external collector. This enhanced data collected from every link in the data center will provide the complete health of the Fabric. The data provided by the Link-service can also be used to predict links which could fail in the future.

Figure 4:
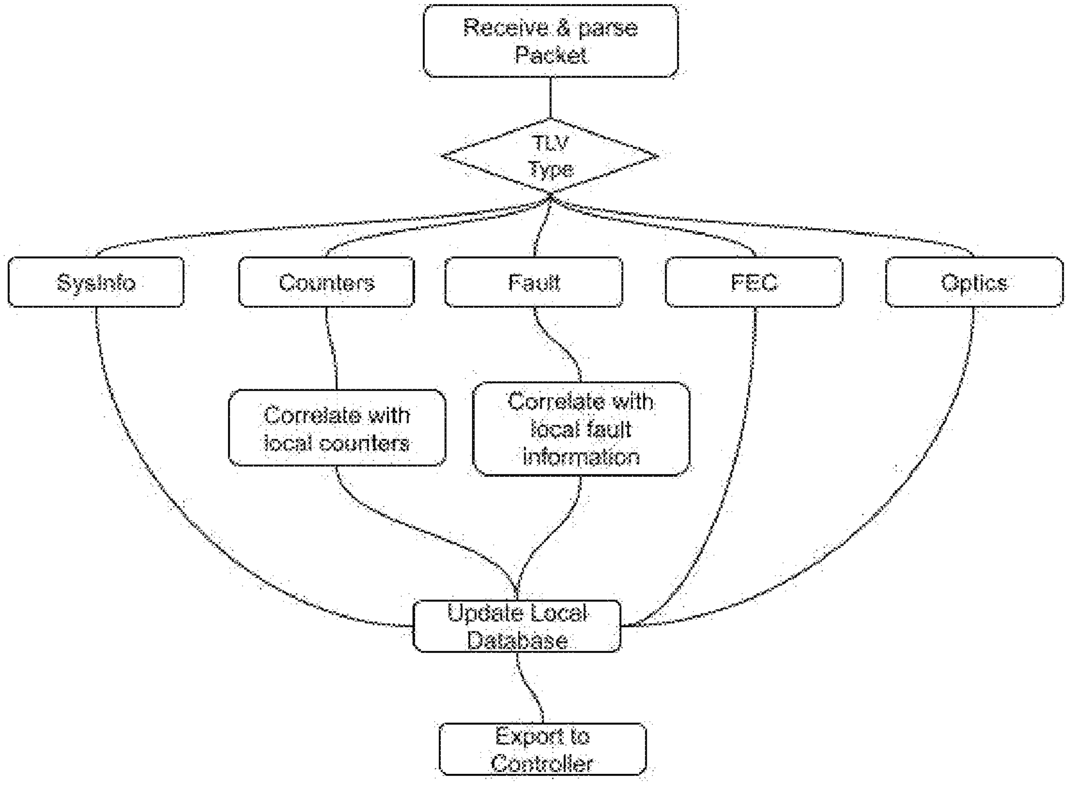
FIG. 4 discloses a link-service receive flow diagram according to an embodiment of the present disclosure.

FIG. 4 discloses a link-service receive flow diagram according to an embodiment of the present disclosure. Upon receiving a packet, the system begins by parsing its contents to identify and extract the various Type-Length-Value (TLV) components included. The TLV types typically found in the packet are SysInfo, Counters, Fault, FEC, and Optics, each encapsulating specific network data. The SysInfo TLV contains system and transceiver information, while the Counters TLV includes data on drop counters and error rates. The Fault TLV details any detected faults or issues within the network, the FEC TLV provides Forward Error Correction data and calculated Bit Error Rate (BER) values, and the Optics TLV contains information about the optical transceivers.

After extracting these TLVs, the system correlates the received information with local fault data and counters to verify and cross-reference the new data against known issues and performance metrics. This correlation helps in identifying any discrepancies or confirming ongoing issues within the network. The updated information is then integrated into the local database, ensuring that the system maintains an accurate and current view of the network's status. Finally, the updated data is exported to the management controller, which oversees the network's overall health and performance, enabling centralized monitoring and management. This process ensures that the network remains robust, with any issues being promptly detected and addressed.

Figure 5:
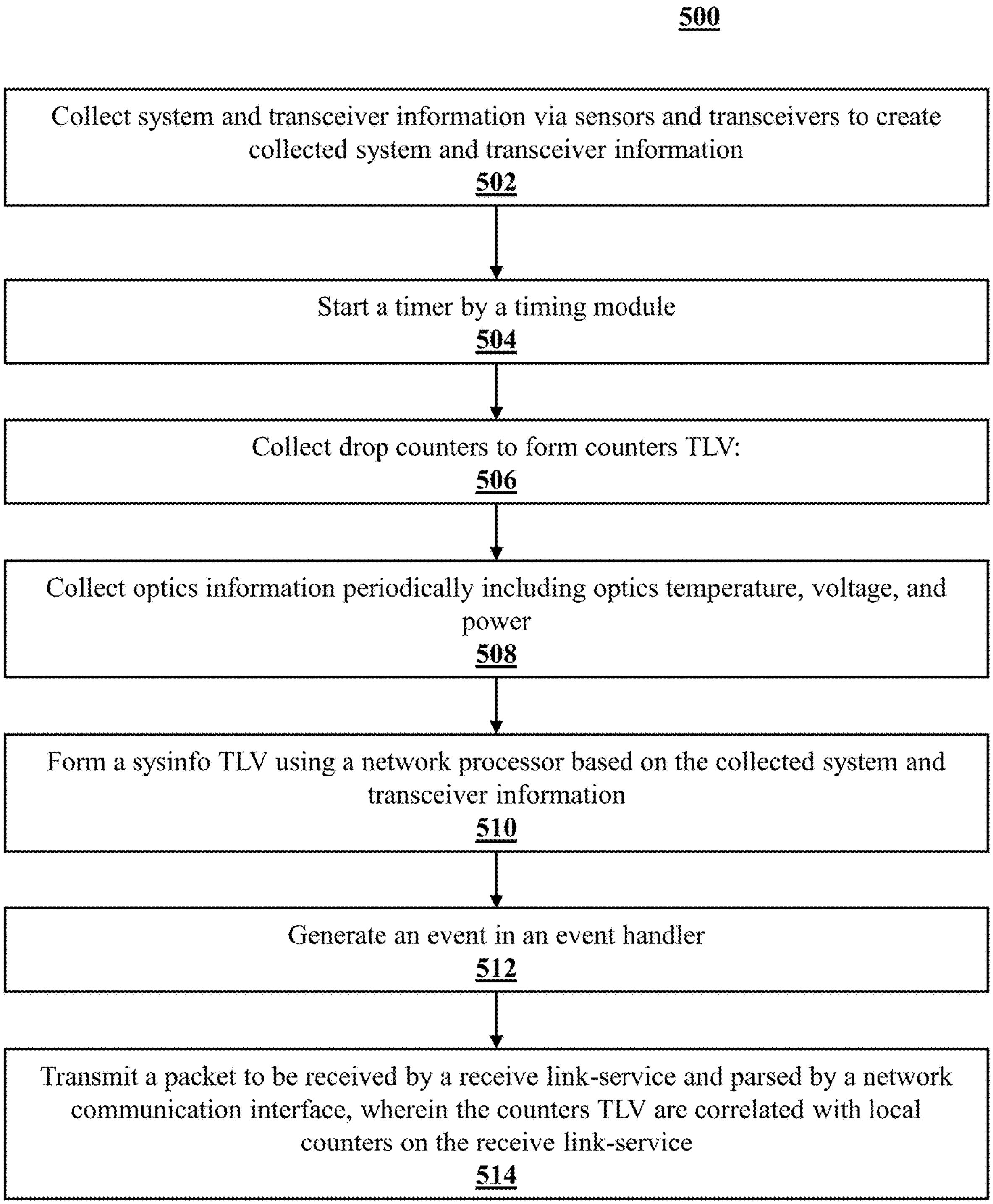
FIG. 5 is a flowchart of an example process according to an embodiment of the present disclosure.

FIG. 5 is a flowchart of an example process 500. In some implementations, one or more process blocks of FIG. 5 may be performed by a management controller. As shown in FIG. 5, process 500 may include collecting system and transceiver information via sensors and transceivers to create collected system and transceiver information (block 502). As also shown in FIG. 5, process 500 may include starting a timer by a timing module (block 504). As further shown in FIG. 5, process 500 may include collecting drop counters to form counters TLV (block 506). For example, the counters TLV may offer data on transmit and receive drops, including information on CRC errors, discards, and other related issues. According to an embodiment, it is part of a Data Packet and is transmitted every 5 seconds to provide up-to-date network performance metrics, as described above. As also shown in FIG. 5, process 500 may include collecting optics information periodically including optics temperature, voltage, and power (block 508). For example, the optics TLV can contain critical optics-related data, including temperature, voltage, and power levels. According to an embodiment, it is included in a Data Packet and is also transmitted every 5 seconds to ensure ongoing monitoring of optical transceiver health. As further shown in FIG. 5, process 500 may include forming a sysinfo TLV using a network processor based on the collected system and transceiver information (block 510). For example, the sysinfo TLV may provide system information, including the operating system and model details, along with optical transceiver data such as vendor, serial number, and manufacturer information. It can be included in an Event Packet and is sent at service start or when an approved optical transceiver is inserted, as described above. As also shown in FIG. 5, process 500 may include generating an event in an event handler (block 512). For example, the management controller may generate an event in an event handler, as described above. As further shown in FIG. 5, process 500 may include transmitting a packet to be received by a receive link-service and parsed by a network communication interface, where the counters TLV are correlated with local counters on the receive link-service (block 514).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method, comprising
starting, using a network processor, a link-service;
collecting system and transceiver information via sensors and transceivers to create collected system and transceiver information;
starting a timer by a timing module;
collecting drop counters to form a counters Type-Length-Value (TLV) structure TLV;
collecting optics information periodically including optics temperature, voltage, and power;
forming a sysinfo TLV structure using a network processor based on the collected system and transceiver information;
generating an event in an event handler;and
transmitting a packet to be received by a receive link-service and parsed by a network communication interface, wherein the counters TLV structure is correlated with local counters on the receive link-service by cross-referencing the received counters TLV structure with local fault data and local counters to identify discrepancies, and integrating the correlated data into a local database of the receive link-service.

2. The method of claim 1, wherein starting the link-service includes initializing communication protocols required for link establishment.

3. The method of claim 1, wherein collecting system and transceiver information includes retrieving data from network devices and sensors.

4. The method of claim 1, wherein starting a timer includes setting a predefined interval for periodic monitoring and data collection.

5. The method of claim 1, wherein forming the sysinfo TLV structure includes encapsulating the collected system and transceiver information into a Type-Length-Value structure.

6. The method of claim 1, wherein transmitting a packet to be received and parsed includes using secure transmission protocols to ensure data integrity and confidentiality.

7. A system comprising:
one or more processors configured to:
start a link-service;
collect system and transceiver information via sensors and transceivers to create collected system and transceiver information;
start a timer by a timing module;
collect drop counters to form a counters Type-Length-Value (TLV) structure PIV;
collect optics information periodically including optics temperature, voltage, and power;
form a sysinfo TLV structure using a network processor based on the collected system and transceiver information;
generate an event in an event handler;
transmit a packet to be received by a receive link-service and parsed by a network communication interface, wherein the counters TLV structure is correlated with local counters on the receive link-service by cross-referencing the received counters TLV structure with local fault data and local counters to identify discrepancies, and integrating the correlated data into a local database of the receive link-service.

8. The system of claim 7, wherein starting the link-service includes initializing communication protocols required for link establishment.

9. The system of claim 7, wherein collecting system and transceiver information includes retrieving data from network devices and sensors.

10. The system of claim 7, wherein starting a timer includes setting a predefined interval for periodic monitoring and data collection.

11. The system of claim 7, wherein forming the sysinfo TLV structure includes encapsulating the collected system and transceiver information into a Type-Length- Value structure.

12. The system of claim 7, wherein transmitting a packet to be received and parsed includes using secure transmission protocols to ensure data integrity and confidentiality.

13. A non-transitory computer-readable medium storing a set of instructions, the set of instructions comprising:

one or more instructions that, when executed by one or more processors of a device, cause the device to:

start a link-service:

collect system and transceiver information via sensors and transceivers to create collected system and transceiver information;

start a timer by a timing module;

collect drop counters to form a counters Type-Length-Value (TLV) structure;

collect optics information periodically including optics temperature, voltage, and power;

form a sysinfo TLV structure using a network processor based on the collected system and transceiver information;

generate an event in an event handler;

transmit a packet to be received by a receive link-service and parsed by a network communication interface, wherein the counters TLV structure is correlated with local counters on the receive link-service by cross-referencing the received counters TLV structure with local fault data and local counters to identify discrepancies, and integrating the correlated data into a local database of the receive link-service.

14. The non-transitory computer-readable medium of claim 13, wherein starting the link-service includes initializing communication protocols required for link establishment.

15. The non-transitory computer-readable medium of claim 13, wherein collecting system and transceiver information includes retrieving data from network devices and sensors.

16. The non-transitory computer-readable medium of claim 13, wherein starting a timer includes setting a predefined interval for periodic monitoring and data collection.

17. The non-transitory computer-readable medium of claim 13, wherein forming the sysinfo TLV structure includes encapsulating the collected system and transceiver information into a Type-Length-Value structure.

18. The non-transitory computer-readable medium of claim 13, wherein transmitting a packet to be received and parsed includes using secure transmission protocols to ensure data integrity and confidentiality.

* * * * *